(12) United States Patent
Seo et al.

(10) Patent No.: US 9,197,985 B2
(45) Date of Patent: Nov. 24, 2015

(54) MOBILE TERMINAL AND CONTROLLING METHOD THEREOF

(71) Applicant: LG ELECTRONICS INC., Seoul (KR)

(72) Inventors: Sangwoo Seo, Seoul (KR); Hyunsun Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/018,974

(22) Filed: Sep. 5, 2013

(65) Prior Publication Data

US 2014/0080416 A1 Mar. 20, 2014

Related U.S. Application Data

(60) Provisional application No. 61/705,587, filed on Sep. 25, 2012.

(30) Foreign Application Priority Data

Sep. 19, 2012 (KR) .......................... 10-2012-0103923

(51) Int. Cl.
*H04B 7/00* (2006.01)
*H04W 4/00* (2009.01)
*H04M 1/725* (2006.01)
*H04M 1/67* (2006.01)
*H04M 1/737* (2006.01)

(52) U.S. Cl.
CPC ............ *H04W 4/008* (2013.01); *H04M 1/7253* (2013.01); *H04M 1/72569* (2013.01); *H04M 1/67* (2013.01); *H04M 1/72577* (2013.01); *H04M 1/737* (2013.01); *H04M 2250/02* (2013.01); *H04M 2250/04* (2013.01); *H04M 2250/52* (2013.01)

(58) Field of Classification Search
CPC ....... H04W 4/008; H04M 1/7253; H04B 5/00
USPC ........ 455/41.1, 41.2, 73, 130, 517, 41.3, 421, 455/156.1, 157.2, 159.1
See application file for complete search history.

(56) References Cited

U.S. PATENT DOCUMENTS

| | | | |
|---|---|---|---|
| 6,952,471 B1 | 10/2005 | Cannon et al. | |
| 2005/0170828 A1 | 8/2005 | Nakamura et al. | |
| 2006/0065709 A1* | 3/2006 | Yamashita | 235/375 |
| 2010/0178873 A1* | 7/2010 | Lee et al. | 455/41.3 |
| 2011/0076003 A1 | 3/2011 | Cho et al. | |
| 2011/0195701 A1 | 8/2011 | Cook et al. | |
| 2011/0212699 A1 | 9/2011 | Howard et al. | |
| 2014/0012528 A1* | 1/2014 | Carmel-Veilleux et al. | 702/88 |

FOREIGN PATENT DOCUMENTS

CN 1801868 A 7/2006

* cited by examiner

*Primary Examiner* — Tuan Pham
(74) *Attorney, Agent, or Firm* — Birch, Stewart, Kolasch & Birch, LLP

(57) ABSTRACT

A mobile terminal including a display configured to display information; a short range communication module configured to exchange a signal with an external control device; and a controller configured to receive the signal from the external control device, determine a context at a timing point of receiving the signal, and control an operation corresponding to the signal to be performed in the determined context. Further, the operation includes at least one of activation/deactivation of the display, an activation/deactivation of a lock mode of the mobile terminal, a volume operation and a camera operation.

18 Claims, 10 Drawing Sheets

FIG. 7
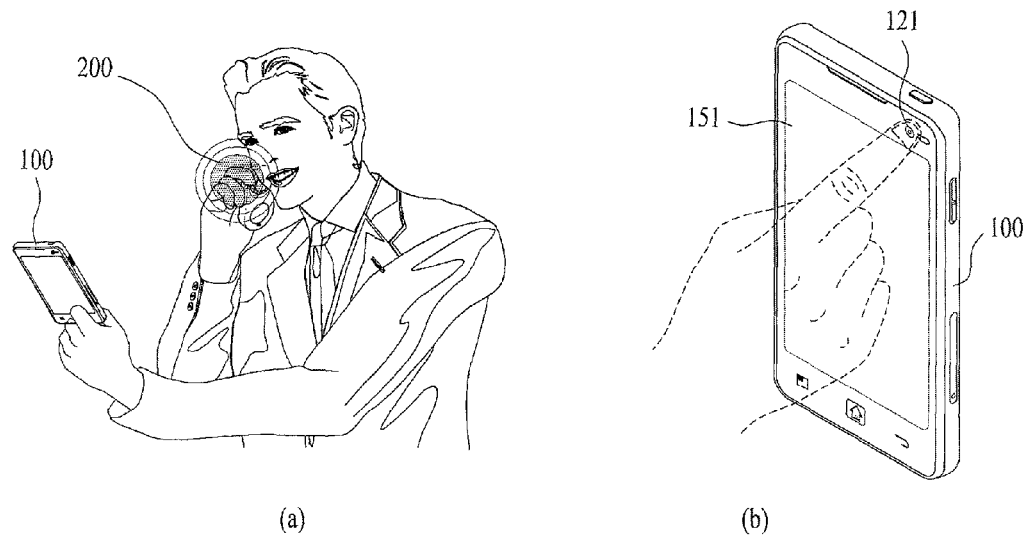
(a) (b)
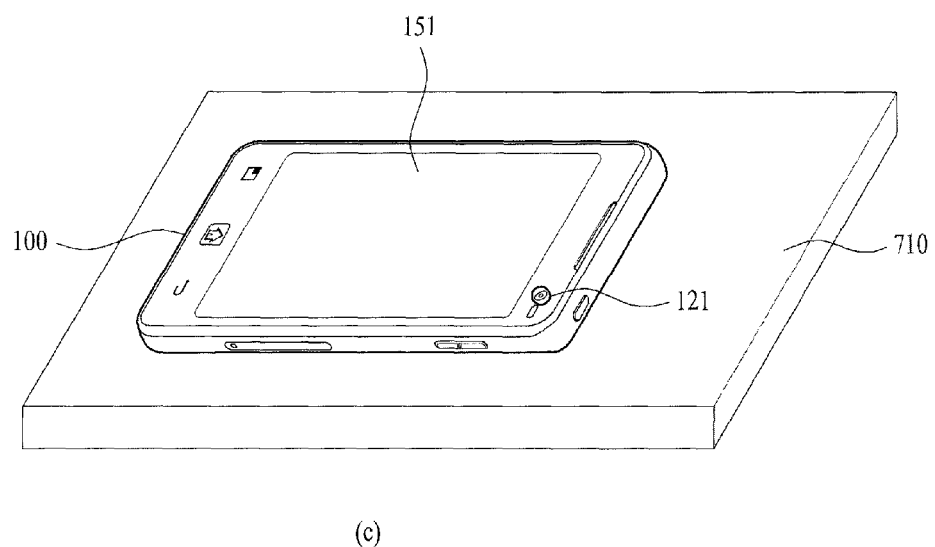
(c)

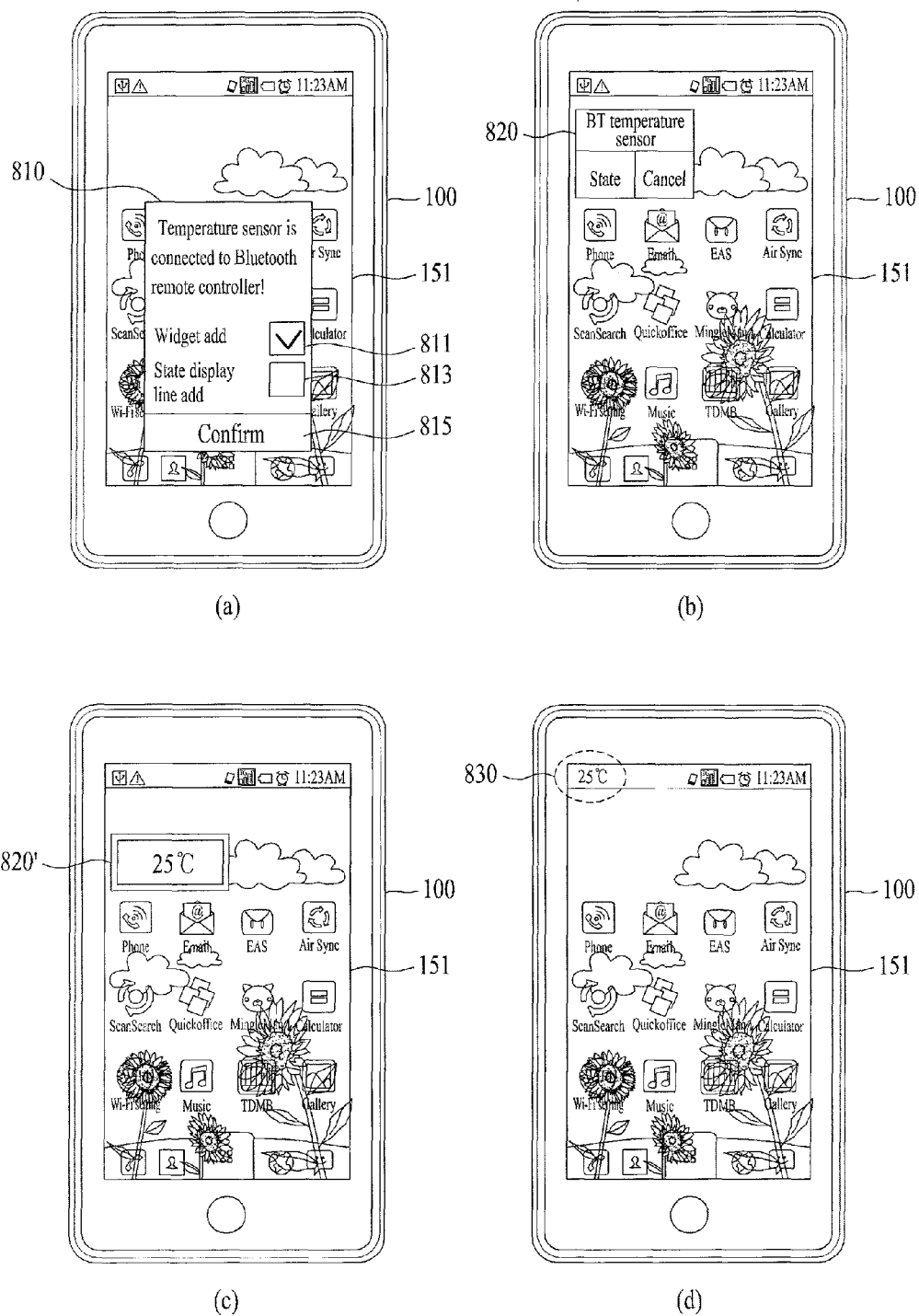

MOBILE TERMINAL AND CONTROLLING METHOD THEREOF

Pursuant to 35 U.S.C. §119(a), this application claims the benefit of earlier filing date and right of priority to Korean Patent Application No. 10-2012-0103923, filed on Sep. 19, 2012, the contents of which are hereby incorporated by reference herein in their entirety. Pursuant to 35 U.S.C. §119(e), this application also claims the benefit of U.S. Provisional Application Ser. No. 61/705,587, filed on Sep. 25, 2012, the contents of which are hereby incorporated by reference in their entirety.

BACKGROUND OF THE INVENTION

1. Field of the Invention

The present invention relates to a mobile terminal, and more particularly, to a mobile terminal, wireless control device and method of controlling the mobile terminal using the wireless control device. Although the present invention is suitable for a wide scope of applications, it is particularly suitable for providing more convenient functions using the wireless control device.

2. Discussion of the Related Art

Generally, terminals can be classified into mobile/portable terminals and stationary terminals. The mobile terminals can be further classified into handheld terminals and vehicle mount terminals.

As functions of the terminal are becoming diversified, the terminal is implemented as a multimedia player provided with composite functions such as photographing of photos or videos, playback of music or video files, game play, broadcast reception and the like for example.

Recently, a mobile terminal of a smart type can perform a function of controlling an external control device and a function in response to a signal received from the external control device using such a short range communication as Bluetooth and the like. However, because most of these functions include a simple exchange of control signals as a function of a voice call, a function of forwarding a played song, a function of volume adjustment and the like, the demand for various kinds of more convenient function is increasingly rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which more convenient functions can be provided using an external device.

Another object of the present invention is to provide a mobile terminal and controlling method thereof, by which different functions can be provided in response to distances from an external (wireless) control device.

A further object of the present invention is to provide a mobile terminal and controlling method thereof, by which a specific function can be adaptively performed in response to a situation if a command for performing the specific function is input via an external (wireless) control device.

Technical tasks obtainable from the present invention are non-limited the above-mentioned technical task. Further, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a short range communication module configured to exchange a signal with an external control device and a controller, if the signal is received from the external control device, determining a context at a timing point of receiving the signal, the controller controlling an operation corresponding to the signal to be performed in the determined context.

In another aspect of the present invention, a wireless control device according to another embodiment of the present invention includes a short range communication module configured to communicate with a mobile terminal, a key button, a light emitting unit configured to emit a light in at least one color, and a control unit controlling light emission of the light emitting unit in response to a pattern of manipulating the key button, the controller controlling a signal corresponding to the pattern of the manipulation to be transmitted to the mobile terminal.

In a further aspect of the present invention, a method of controlling a mobile terminal using a wireless control device according to a further embodiment of the present invention includes the steps of pairing a mobile terminal and a wireless control device with each other, inputting a command to the wireless control device, transmitting a signal corresponding to the input command to the mobile terminal from the wireless control device, determining a context of a timing point of receiving the signal in the mobile terminal, and performing an operation corresponding to the signal in the determined context in the mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating one example of a method of activating a camera in response to a context from an external control device in a mobile terminal according to one embodiment of the present invention; and FIG. 8 is a diagram illustrating display screen configurations to describe an operation in response to a sensing value received from an external control device in a mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
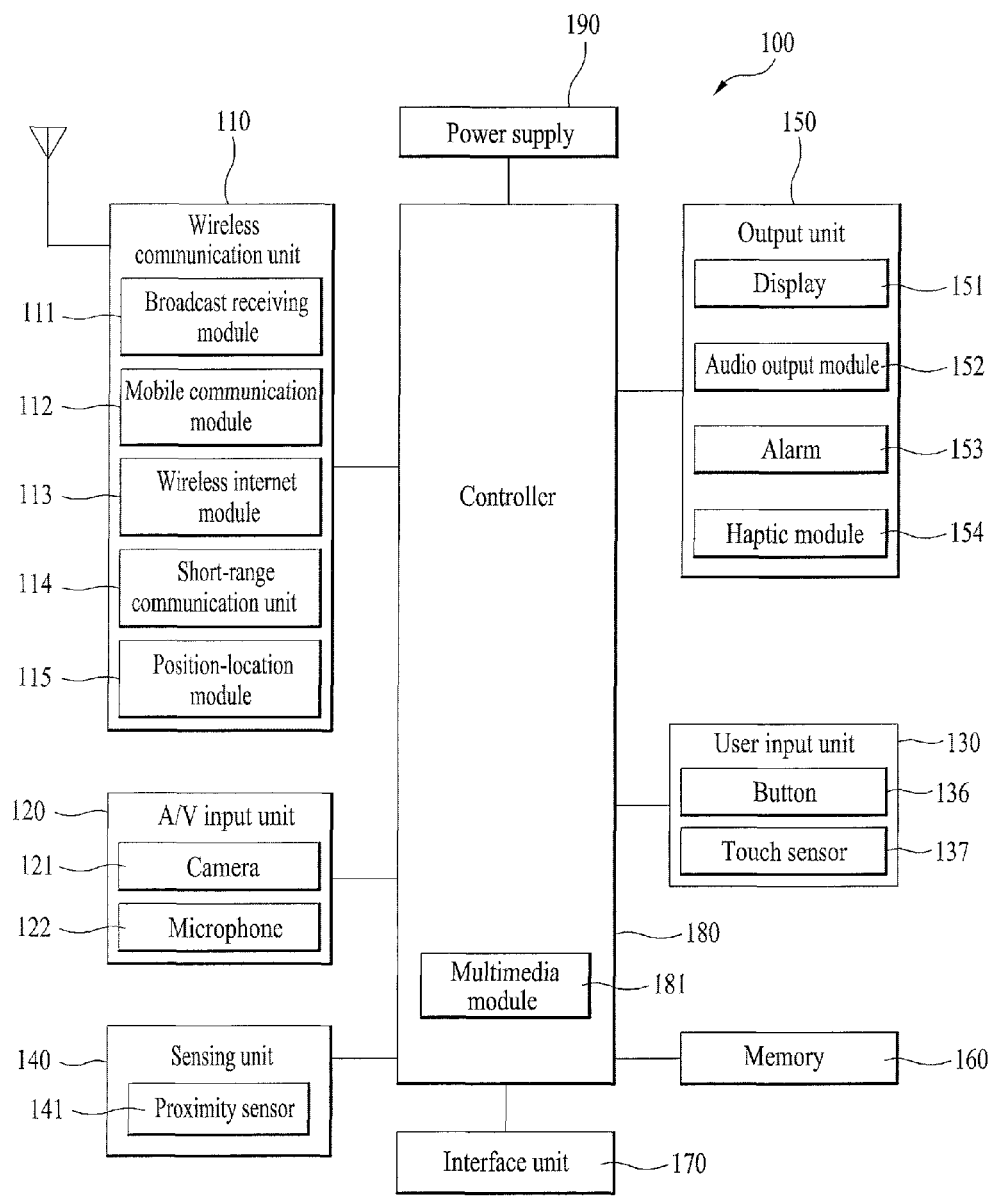
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™ to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor 141 is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen is named 'contact touch'. In addition, a position, at which the proximity touch is made to the touchscreen using the pointer, may mean a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectable to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2A:
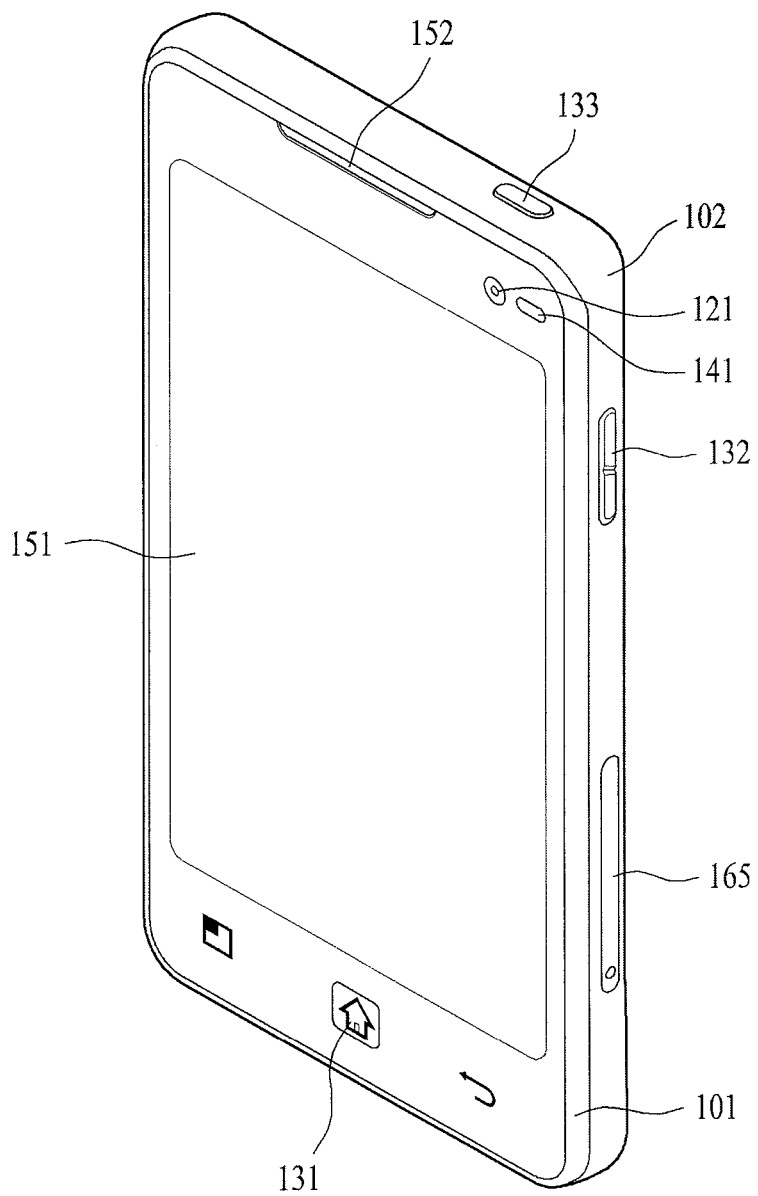
FIG. 2A and FIG. 2B are front and rear perspective diagrams of a mobile terminal according to one embodiment of the present invention.

Next, FIG. 2A is a front perspective view of a mobile terminal according to one embodiment of the present invention. The mobile terminal 100 illustrated in FIG. 2A has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2A, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Figure 2B:
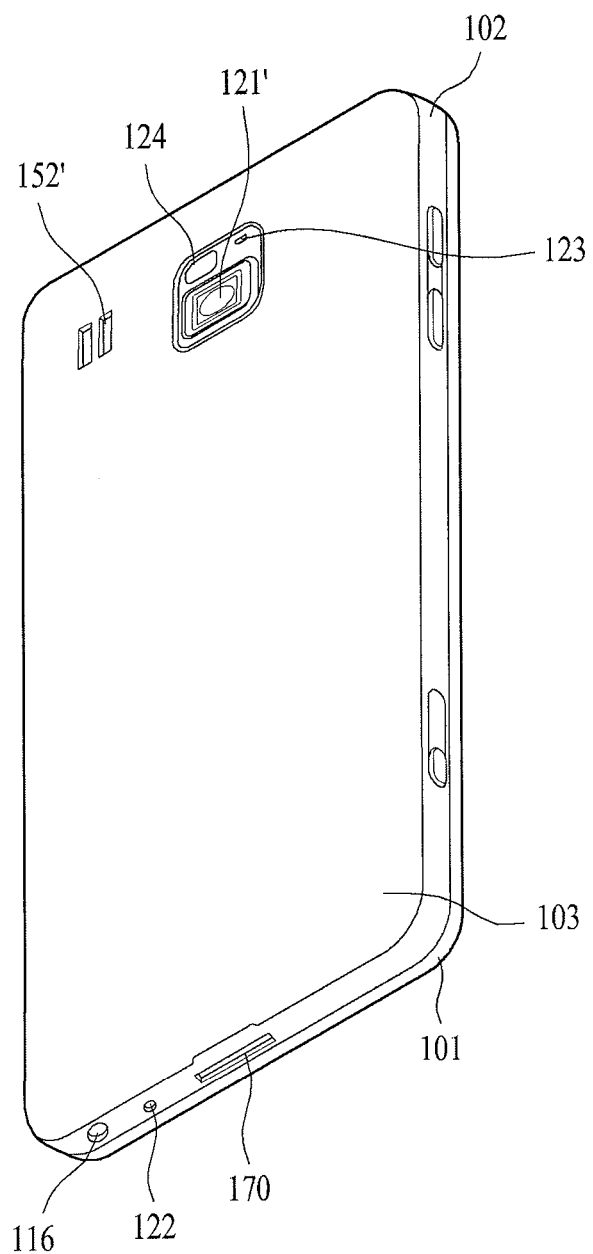

FIG. 2B is a rear perspective view of the terminal of FIG. 2A. Referring to FIG. 2B, a camera 121' can be additionally provided at a rear of the terminal body, and more particularly, at the rear case 102. The camera 121' captures images along a direction that is substantially opposite to that of the camera 121 (see FIG. 2A) and may have a pixel resolution different from that of the camera 121.

According to one embodiment, for instance, the camera 121 has a relatively low number of pixels sufficient to capture and transmit a picture of a user's face for a video call, while the camera 121' has a relatively high number of pixels for capturing a photograph (e.g., a finer detail photograph) of a general subject. Furthermore, each of the cameras 121 and 121' can be installed on the terminal body to be rotated or popped up.

A flash 123 and a mirror 124 are additionally provided adjacent to the camera 121'. The flash 123 projects light toward a subject for photographing the subject using the camera 121'. When a user attempts to take a picture of the user (self-photography) using the camera 121', the mirror 124 enables the user to view the user's face as reflected by the mirror 124.

An additional audio output module 152' can be provided at the rear of the terminal body. The additional audio output module 152' is for implementing a stereo function together with the audio output module 152 (see FIG. 2A) and may be used for implementation of a speakerphone mode when speaking over the terminal.

A broadcast signal receiving antenna 116 can be additionally provided at the lateral side of the terminal body as well as an antenna for communication. The broadcast signal receiving antenna may constitute a portion of the broadcast receiving module 111 (see FIG. 1) and be retractable into the terminal body.

A power supply unit 190 (FIG. 1) for supplying a power to the terminal 100 is also provided at the terminal body. Furthermore, the power supply unit 190 can be configured to be built within the terminal body. Alternatively, the power supply unit 190 can be configured to be detachably connected to the terminal body.

A touchpad for detecting a touch can be additionally provided at the rear case 102. The touchpad can be configured as a light transmittive type similar to the display 151. In this instance, if the display 151 is configured to output visual information from both of its faces, the visual information is viewable via the touchpad as well. The information output from both of the faces can be entirely controlled by the touchpad.

Alternatively, a display is further provided for the touchpad so that a touchscreen can be provided at the rear case 102 as well. The touchpad is activated by interconnecting with the display 151 of the front case 101. The touchpad can be provided at the rear of the display 151 to extend parallel to the display 151. The touchpad can have a size equal to or smaller than the size of the display 151.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

External Control Device

In the following description, an external control device applicable to embodiments of the present invention is explained. First of all, an external control device according to an embodiment of the present invention can exchange signals with a mobile terminal via the short range communication module 114 of the mobile terminal. Hence, the external control device may be named a wireless control device or a remote controller. The external control device preferably supports at least one of communication systems supported by the short range communication module 114. In the present specification, Bluetooth version 4.0 is assumed as the communication system. Compared to a previous version, the Bluetooth version 4.0 further enhances low-power consumption and low-capacity communication. Hence, the Bluetooth version 4.0 reduces power consumption.

One example of the configuration of the external control device is described with reference to FIGS. 3A and 3B as follows. In particular, FIG. 3A is a diagram illustrating one example of configurations of an external control device applicable to embodiments of the present invention.

Figure 3A:
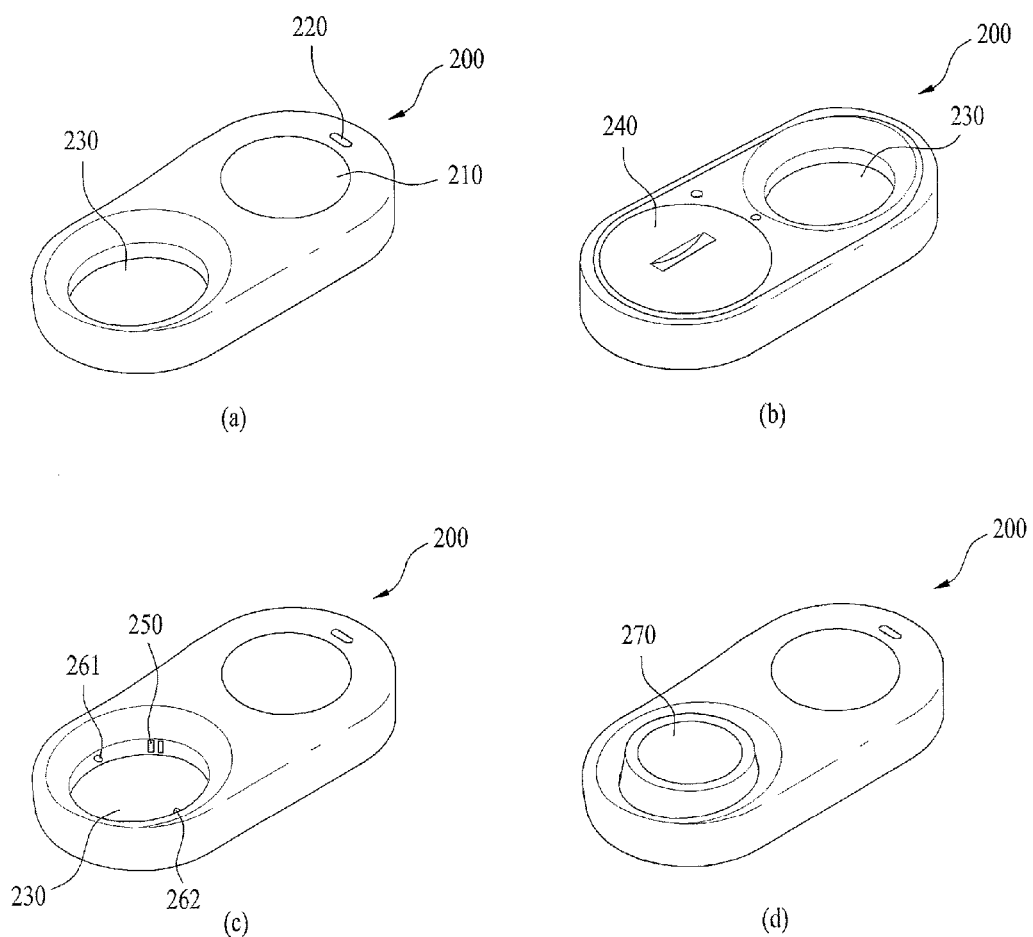
FIG. 3A is a diagram illustrating one example of configurations of an external control device applicable to embodiments of the present invention.

Referring to FIG. 3A(a), an external control device 200 includes an oval-shaped body. Further, a key button 210 and a light emitting unit 220 are provided to one length-directional side of a top surface of the external control device 200. The key button 210 may include a general push-type key button or a touch button. The light emitting unit 220 may emit a light to indicate a status of the external control device 200 or may emit a light in response to a manipulation pattern of the key button 210.

Also, the light emitting unit 220 can emit the light in at least two different colors. For instance, the light emitting unit 220 may flash on and off in a first color as many times as the number of pressing the key button 210. In another example, if a power of the external control device 200 almost becomes exhausted, the light emitting unit 220 may flash on and off in a second color to indicate such a status. In case that the external control device 200 is disconnected from the mobile terminal 100 (i.e., a paring with the mobile terminal 100 is cancelled), the light emitting unit 220 can flash on and off in a first color and a second color alternately.

A perforated opening 230, i.e., a circular hole 230 may be provided to the other length-directional side of the top surface of the external control device 200. In particular, the circular hole 230 may play a role as a key holder or enable a user to hold the external control device 200 by inserting a finger therein.

Referring to FIG. 3A(b), a battery cover 240 is provided to one length-directional side of a bottom surface (i.e., a bottom surface portion corresponding to the key button provided top surface) of the external control device 200. In this instance, the battery cover 240 is installed to be detachable from the body for a battery exchange. Further, the circular hole 230 is formed in the other length-direction side of the bottom surface of the external control device 200.

Meanwhile, the external control device 200 according to an embodiment of the present invention may be coupled with a replaceable sensor. To this end, referring to FIG. 3A (c), an electrode 250 and at least one or more fixing projections 261 and 262 may be provided to an inner circumference of the circular hole 230 of the external control device 200. In particular, the electrode 250 is provided to exchange signals and/or a power with the replaceable sensor. Also, the fixing projection literally plays a role in fixing the replaceable sensor thereto. In addition, FIG. 3A(d) shows one example of a configuration in which the replaceable sensor 270 is inserted in and coupled with the circular hole.

Owing to the above-described configuration, the external control device 200 can transmit information on a sensing value sensed by the replaceable sensor 270 to the mobile terminal 100 as well as an indication signal indicating a presence of the external control device 200 and a signal corresponding to a button push. A function in response to the number of button push(es) and a flashing pattern will be described in detail later.

For example, the replaceable sensor 270 may include one of a temperature sensor configured to measure a temperature, a humidity sensor configured to measure a humidity, a UV sensor configured to measure a ultraviolet ray index, a GPS configured to obtain a location information, a blood flow sensor configured to measure a blood flow and the like. In particular, the blood flow sensor may have a ring shape and be configured to measure a blood flow in a finger that is fitted into a circular hole provided to a center of the ring shape.

Figure 3B:
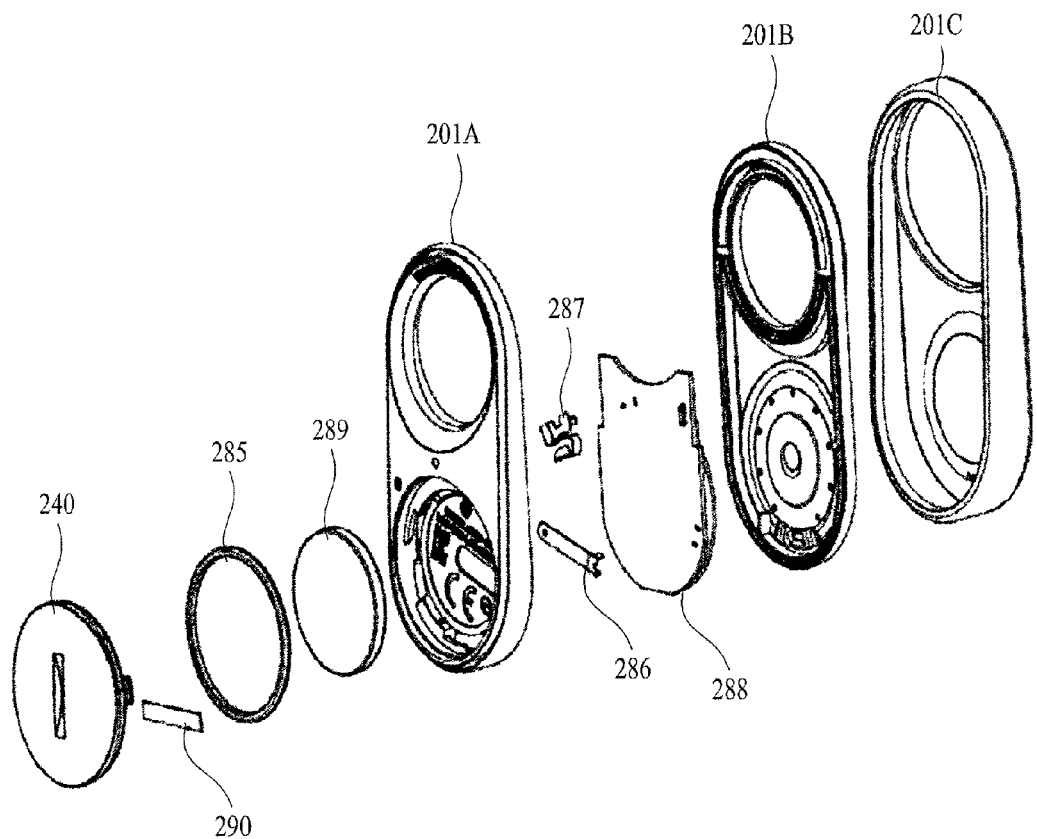
FIG. 3B is a diagram illustrating one example of an internal structure of an external control device applicable to embodiments of the present invention.

Next, FIG. 3B is a diagram illustrating one example of an internal structure of an external control device applicable to embodiments of the present invention. Referring to FIG. 3B, as mentioned in the foregoing description, an external control device can include a battery cover 240. Further, a serial label 290, on which other information including a serial number, a model name and the like are printed, may be attached to an inner side of the battery cover 240.

A shield ring 285 is provided between the battery cover 240 and the battery 289. Hence, the shield ring 285 can enhance the fixability of the battery 289. In addition, the shield ring 285 maintains an airtight state between a lower case 201A and the battery cover 240, thereby preventing influx of particles. Moreover, the external control device can include contact points 286 and 287 per battery polarity to enable the battery 289 to deliver a power to a PBA (PCB board assembly) 288. In this instance, the PBA 288 may include at least one of a short range communication module for short range communication, a power unit, an audio/vibration output mechanism and a control unit for controlling the above-mentioned components.

In this instance, the audio/vibration output means and the light emitting unit 220 can be integrated to be called 'output unit'. Moreover, the PBA 288 can be configured as at least one element of the key button 210. For instance, the PBA 288 can be built in one body of the contact point except the key button cover. Besides, the external control device can further include a cap case 201C configured to be additionally put on the upper case 201B and the lower case 201A.

Meanwhile, the configuration and the internal structure of the external control device 200 are exemplarily shown in FIGS. 3A and 3B, respectively, by which the present invention is non-limited. Further, the present invention is applicable to various configurations of other external control devices capable of providing the functions similar to those of the above-described external control device 200.

In order to exchange signals with the above-described external control device by Bluetooth, the mobile terminal 100 may be simultaneously connected to at least one or more Bluetooth devices as well as to the external control device. When the mobile terminal 100 is connected to a plurality of the Bluetooth devices, it can selectively activate or deactivate at least one of the Bluetooth devices.

Processing Signal Received from External Control Device in Response to Context

In the following description, a method of performing a prescribed function in response to a signal received from an external control device in a mobile terminal according to one embodiment of the present invention is explained with reference to FIG. 4.

Figure 4:
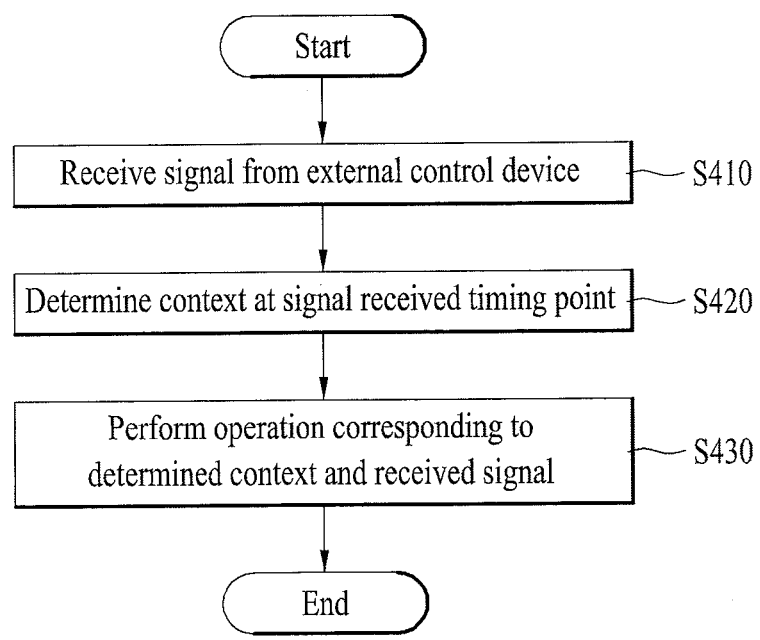
FIG. 4 is a flowchart illustrating one example of a method for performing a prescribed function in response to a signal received from an external control device in a mobile terminal according to one embodiment of the present invention.

FIG. 4 is a flowchart illustrating one example of a method for performing a prescribed function in response to a signal received from an external control device in a mobile terminal according to one embodiment of the present invention. Referring to FIG. 4, the mobile terminal and the external control device are assumed to be already paired with each other.

If a signal is received from the external control device via the short range communication module 114 (S410), the controller 180 determines a context at the timing point of receiving the signal (S420). In doing so, receiving the signal from the external control device 200 may include one of a case of manipulating the key button 210 of the external control device 200, a response to receiving an information request from the mobile terminal, a transmission of an unsolicited sensing value from the external control device 200, a transmission of a periodic distance measurement signal in a prescribed mode, and the like.

If the controller 180 determines the context at the signal reception timing point, it may mean that a distance between the mobile terminal 100 and the external control device 200 is determined using a strength (e.g., RSSI (received signal strength intensity/indication, etc.) of the received signal or may mean that a current operating state (e.g., display ON/OFF, a type or settings of a currently active application, a presence or non-presence of an incoming call signal, etc.) of the mobile terminal 100 is determined. Thereafter, the controller 180 can perform an operation corresponding to the received signal in consideration of the determined context (S430).

Table 1 shows examples of the flash of the light emitting unit 220 in response to a pattern in manipulating the key button 210 of the external control device 200 according to an embodiment of the present invention and the corresponding operation of the mobile terminal 100. In Table 1, assume that the light emitting unit 220 can flash in two colors (e.g., green and red).

TABLE 1

| Action of key button of external control device | Status of connection to terminal | Light emitting unit | Description |
| --- | --- | --- | --- |
| Key button action | Short push once | Connected | Flash in green once | Music play/stop, camera shutter, video recording start/stop, call accept/end, next image in image watching, page turn |
| Connection related events | Short pushes twice | Connected | Flashes in green twice | Next song in music, previous image in image watching |
| | Short pushes 3 times | Connected | Flashes in green 3 times | Initial/previous song in music |
| | Long push (3 seconds) and release | Connected | Flashes in green 4 times | Enter camera mode in IDLE state |
| | Short pushes at least 5 times | Connected | Flashes in green 5 times | Alarm and vibration to indicate a mobile phone location |
| | Long push (6 seconds) and release | Before connection | Alternate flashes in red and green for 1 minute | Operation in an advertising mode for 1 minute (Pairing attempt. Yet, the advertising mode is ended if a key button is short pushed once in the course of the attempt.) |
| | N/A | Connection completed | Flashes in green 4 times | Successful connection to terminal after advertising |
| | N/A | Disconnected | Alternate flashes in red and green for 1 minute | Disconnected due to a distance over about 10 meters between terminal and external control device (enter Link loss & Disconnect), Attempt autonomous reconnection |

For instance, referring to Table 1, if the key button 210 is short manipulated once in the context of the successful pairing between the mobile terminal 100 and the external control device 200, the external control device 200 controls the light emitting unit 220 to flash in green once and transmits a corresponding signal to the mobile terminal 100. If the corresponding signal is received, the controller 180 determines whether a currently active application is present.

If a music application is currently active, the controller 180 may control a music play to start or stop. If a camera application is currently active, the controller 180 can initiate a video- or still image-taking. If a call signal is being received, the controller 180 may answer or reject a phone call. In another instance, if a camera application activation command is received while playing music in the mobile terminal 100, the music play may be interrupted.

In another instance, before the mobile terminal 100 and the external control device 200 are paired with each other, if the key button 210 is manipulated for at least 6 seconds and then released, the external control device 200 may operate in an advertising mode for a prescribed duration (e.g., 1 minute) to be found for the pairing by the mobile terminal 100. Thereafter, if the pairing is successfully completed, the external control device 200 may control the light emitting unit 220 to flash in green 4 times to indicate the successful connection. For an occurrence of disconnection after the successful pairing (Link Loss & Disconnect), the external control device 200 attempts an automatic reconnection and also controls the light emitting unit 220 to alternately flash in red and green to indicate the current status.

Of course, the number of key button manipulation(s), the flash pattern of the light emitting unit and the corresponding functions matched thereto are just shown in Table 1 for example, by which the present invention is non-limited. In addition, the present invention is applicable to different or various matching combinations. Meanwhile, the mobile terminal 100 according to an embodiment of the present invention may perform various operations in response to a distance from the external control device 200.

In the following description, various functions performed in response to a distance from the external control device 200 are explained in detail with reference to FIG. 5 and FIG. 6.

Figure 5:
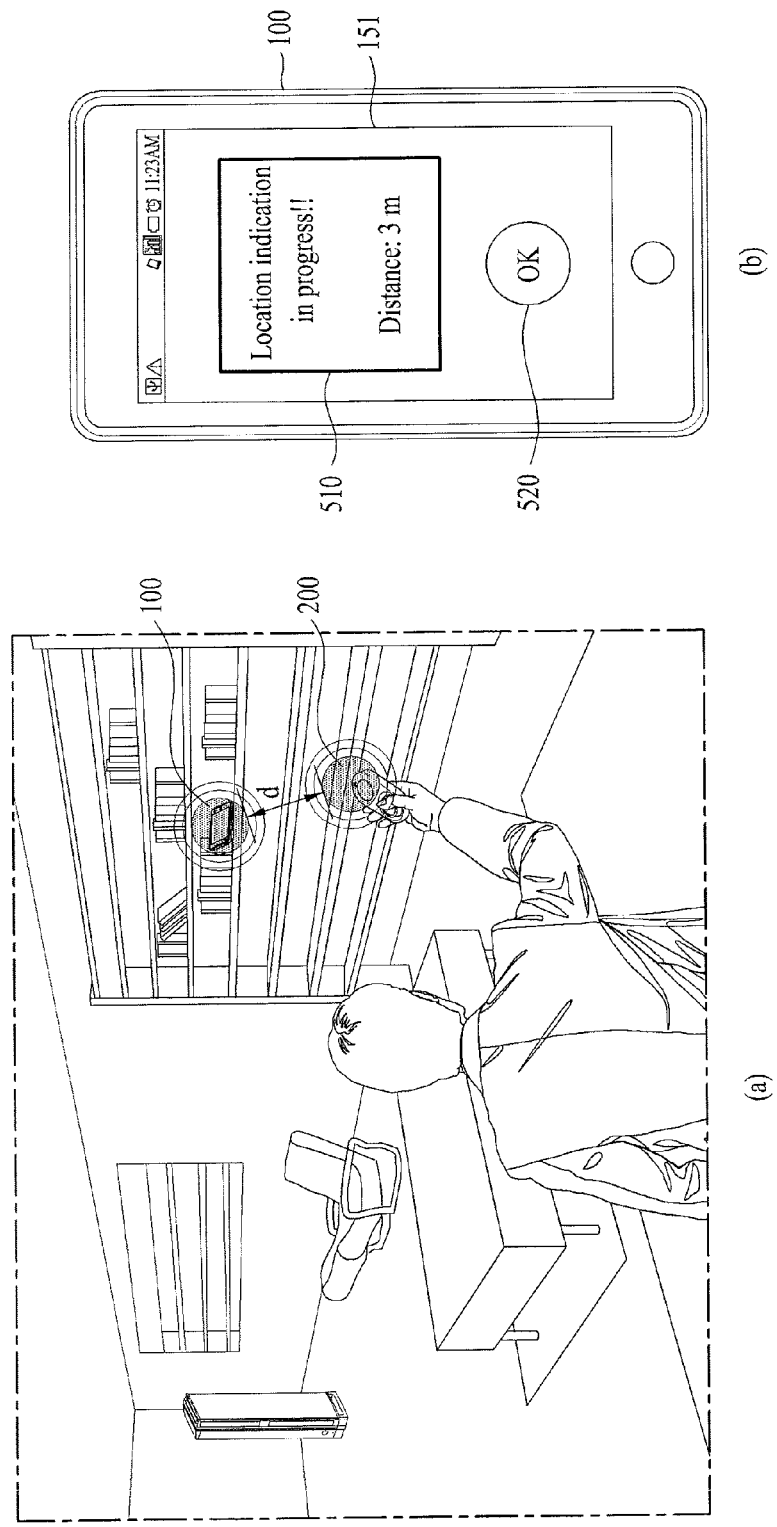
FIG. 5 is a diagram illustrating one example of a method for finding a mobile terminal using an external device according to one embodiment of the present invention.
Figure 6:
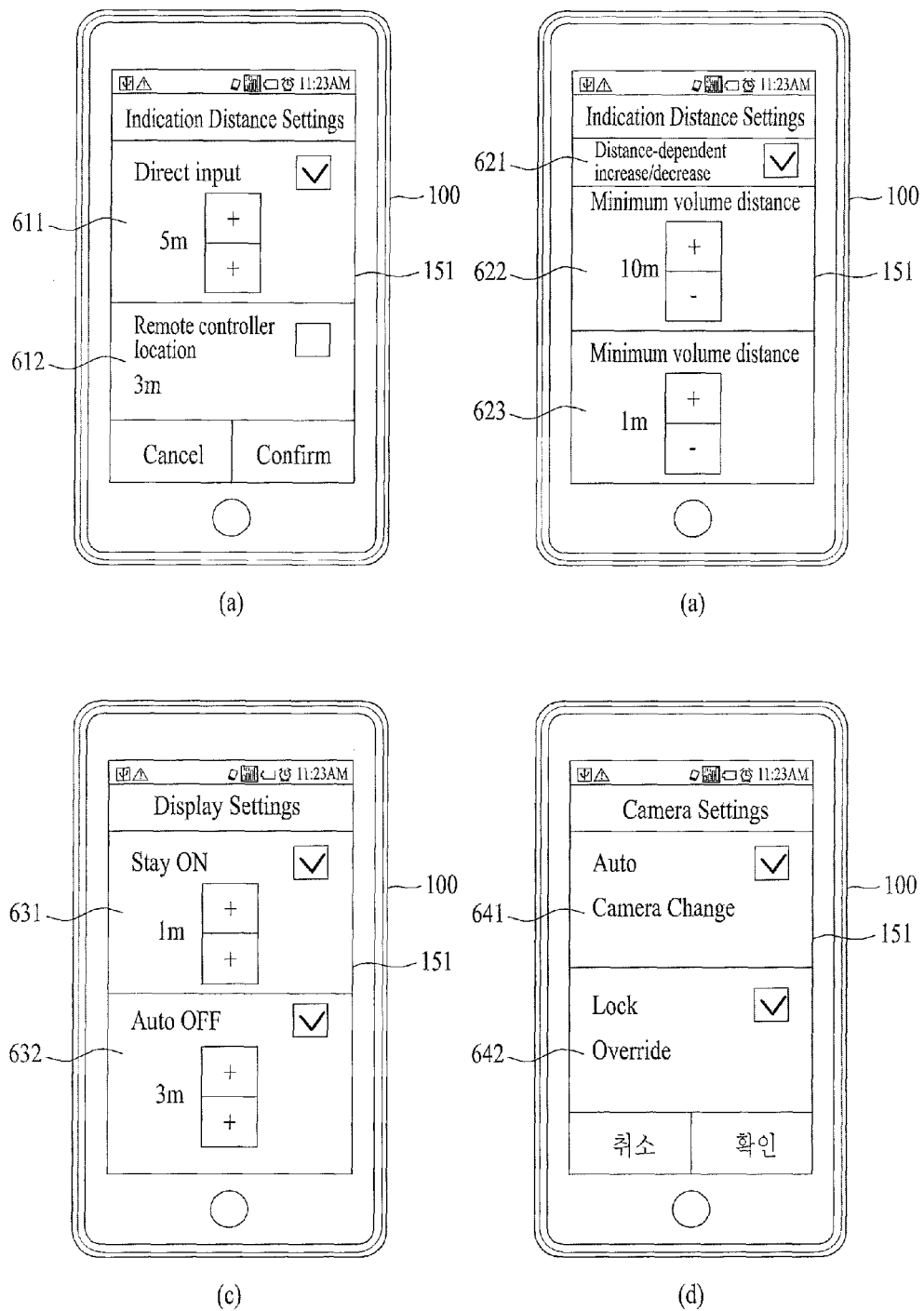
FIG. 6 is a diagram illustrating display screen configurations of one example of a menu configuration for setting a function executable in each context in a mobile terminal according to one embodiment of the present invention.

FIG. 5 is a diagram illustrating one example of a method for finding an mobile terminal 100 using an external control device according to one embodiment of the present invention. Referring to FIG. 5(a), if a user applies a manipulation (e.g., 5 short pushes) of the key button 210 of the external control device 200, the external control device 200 transmits a signal corresponding to the manipulation to the mobile terminal 100. Subsequently, the mobile terminal 100 can indicate its location using a mechanism (e.g., vibration, sound output, etc.) previously determined for the received signal.

In doing so, a size and/or type of a vibration pattern or sound may vary depending on a distance d between the mobile terminal 100 and the external control device 200. In particular, the controller 180 determines the distance from the external control device 200 using a strength of the received signal and can then output the sound/vibration corresponding to the determined distance via at least one of the audio output module 152, the alarm 153, the haptic module 154 and the like. For instance, the closer the external control device 200 gets, the louder the sound output by the mobile terminal 100 becomes.

Referring to FIG. 5(b), when the mobile terminal 100 indicates its location, a popup window 510, which indicates that the operation corresponding to the received signal is being performed (i.e., the location indicating operation), can be displayed on the touchscreen 151. In this instance, the distance determined by the controller 180 may be displayed on the popup window 510.

Moreover, a confirmation button (OK) 520 may be displayed on the touchscreen 151. If a user touches the confirmation button 520, the controller 180 may stop the corresponding operation (e.g., the sound output, the vibration output, etc.). Of course, while the mobile terminal 100 is performing the indication operation, as the key button 210 of the external control device 200 is manipulated, if the mobile terminal 100 receives a signal corresponding to the key button manipulation, the corresponding operation may be stopped.

On the contrary to the configuration shown in FIG. 5(a), if the mobile terminal 100 transmits a signal to the external control device 200, the mobile terminal 100 can control the light emitting unit 220 of the external control device 200 to initiate its light emission or can activate the audio output unit. Moreover, the popup window 510, which is configured to indicate that the operation corresponding to the signal received from the external control device 200 is in progress, can be accompanied with at least one of the operations included in Table 1 as well as with the location indicating operation.

In the following description, different functions executable in the mobile terminal 100 in accordance with contexts and menu configurations configured to set the different functions are explained with reference to FIG. 6. In particular, FIG. 6 is a diagram illustrating display screen configurations of one example of a menu configuration for setting a function executable in each context in a mobile terminal according to one embodiment of the present invention.

First of all, according to an embodiment of the present embodiment, if a distance between a mobile terminal and an external control device becomes equal to or greater than a threshold distance, a warning sound or vibration can be generated. In doing so, one example of a setting menu for setting the threshold distance is shown in FIG. 6(a).

Referring to FIG. 6(a), setting menus displayable on the touchscreen 151 of the mobile terminal 100 may include a direct setting menu 611 for directly receiving an input of a threshold distance from a user and a detection distance menu 612 for setting a threshold distance to a currently detected distance of the external control device. It can determine whether to use each of the menus 611 and 612 by selecting a check box provided to a right side of each of the menus. If a numeral part of the direct setting menu 611 is touched, a virtual keypad for inputting numerals may be displayed. In particular, it may be also able to change the numerals by touching a button '+/−'. If a user is not sure of a displayed distance, the direction distance menu 612 may be useful. To this end, the user can conveniently select the threshold distance by spacing the mobile terminal and the external control device apart from each other by a desired distance and then selecting the detection distance menu 612.

According to the present embodiment, a volume can be adjusted for a music play in response to a distance between a mobile terminal and an external control device. In particular, if the external control device is located close to the mobile terminal, a sound may decrease. If the external control device is located distant from the mobile terminal, a sound may increase. This may be specifically useful when a user is moving by carrying the external control device. One example of a setting menu for setting a distance dependent volume increase/decrease function is shown in FIG. 6(b).

Referring to FIG. 6(b), setting menus displayable on the touchscreen 151 of the mobile terminal 100 may include a selection menu 621 for selecting whether to use a distance-dependent volume increase/decrease function, a maximum volume distance menu 622 for determining a distance for outputting a maximum volume, a minimum volume distance menu 623 for determining a distance for outputting a minimum volume, and the like. In this instance, the minimum volume does not mean a zero value (i.e., mute) but may mean a default volume or a volume at a currently set level. Moreover, in an interval between a minimum volume distance and a maximum volume distance, a volume may increase in proportion to a distance.

According to the present embodiment, it can determine whether to activate or deactivate a display depending on a distance between a mobile terminal and an external control device. One example of a menu for setting a distance-dependent display activate/deactivate function is shown in FIG. 6(c).

Referring to FIG. 6(c), setting menus displayable on the touchscreen 151 of the mobile terminal 100 may include a stay-on menu 631 for controlling a display not to be turned off in case of a presence of an external control device within a threshold distance and an auto-off menu 632 for controlling the display to be automatically turned off in case of the external control device getting distant from the mobile terminal over the threshold distance.

In this instance, if the distance between the mobile terminal and the external control device deviates from the threshold distance set via the auto-off menu 632, it can control a lock mode to be automatically entered as soon as the display is turned off. In this instance, the lock mode may mean the mode in which a limited function (e.g., an emergency call, etc.) is performed until a presence of an input (e.g., a touch input of a specific touch pattern, an input of a password, etc.) for cancelling the corresponding mode. After the lock mode has been entered in response to the deviation from the threshold distance, if the distance between the mobile terminal and the external control device becomes equal to or smaller than the threshold distance, the lock mode can be automatically cancelled without an input for the mode cancellation.

As the distance between the mobile terminal and the external control device exceeds the threshold distance, although the display unit is turned off, it can control a sound to keep being output until the distance exceeds a second threshold distance greater than the threshold distance. If the distance exceeds the second threshold distance, it can control the sound not to be output.

According to the present embodiment, if a camera activate command or a camera photographing application activate command is received from an external control device, the mobile terminal 100 can determine a camera to activate by selecting the front camera 121 or the rear camera 121' depending on a context. One example of a menu for setting a context-dependent camera selection activating function is shown in FIG. 6(d).

Referring to FIG. 6(d), setting menus displayable on the touchscreen 151 of the mobile terminal 100 may include a camera auto-switching menu 641 for determining a camera to be activated automatically and a lock override menu 642 for determining whether to activate a camera by ignoring the active lock mode mentioned in the foregoing description. Further, it can determine whether to apply the function according to each of the menus depending on a selection of a check box provided to a right side of each of the menus.

In general, because a lock mode is the function having a relatively high priority in an operating system, an application, which is separately installed irrespective of the operating system, is unable to override the lock mode. Hence, the present function is preferably set on an operating system level. Through this, even if the lock mode is active, a user can active a camera without manipulating the mobile terminal in direct to cancel the lock mode. Therefore, the present function is convenient when a user starts photographing while carrying an external control device spaced apart from the mobile terminal.

When the above-mentioned camera auto-switching menu is set, a method of determining a camera to be activated by a mobile terminal is described in detail with reference to FIG. 7 as follows. In particular, FIG. 7 is a diagram illustrating one example of a method of activating a camera in response to a context from an external control device in a mobile terminal according to one embodiment of the present invention.

Referring to FIG. 7(a), while a user holds the mobile terminal 100 in their hand, the user attempts a self-camera photographing. In doing so, if the user intends to normally perform the photographing using the rear camera 121' of high performance rather than the front camera 121, since the touchscreen 151 provided to a front side of the mobile terminal 100 faces toward an opposite side of the user, the user is unable to watch the touchscreen 151 provided to the front side of the mobile terminal 100. Hence, it may be difficult for the user to manipulate a virtual shutter button of a camera application displayed on the touchscreen 151 provided to the front side of the mobile terminal 100. In doing so, it may be convenient for the user to perform the activation of the camera application and the manipulation of the shutter button using an external control device 200.

However, as a command for activating the camera application is received from the external control device 200, when the camera application is running, if an initially activated camera is the front camera 121 (e.g., a case that a last photographing is performed using the front camera, a case that a default camera is the front camera, etc.), the user should input a command for camera switching before performing the photographing. In order to resolve such inconvenience, according to the present embodiment, the controller 180 determines a camera to activate.

For instance, referring to FIG. 7(b), when the front camera 121 is blocked by a user's finger or the like, the controller 180 determines that the user has no intention to use the front camera 121 and can then directly activate the rear camera 121' (irrespective of the basic camera settings). In doing so, if a preview image taken via the front camera 121 has a brightness equal or smaller than a predetermined brightness or it is detected that an obstacle is present within a predetermined distance via the proximity sensor 114, the controller 180 can determine that the front camera 121 is blocked. Similarly, when the initially activated camera is the rear camera 121', if a preview image taken via the rear camera 121' has a brightness equal or smaller than a predetermined brightness, the controller 180 can automatically activate the front camera 121.

Moreover, in automatically determining a camera to activate, it can consider an arranged state of the mobile terminal 100. For instance, referring to FIG. 7(c), assume the front side of the mobile terminal 100 is placed on a flat plane 710 to face upward. If so, the controller 180 determines that the front side of the mobile terminal 100 is arranged to have its front side face upward using at least one of the gyro sensor, the geomagnetic sensor, the acceleration sensor and the like and is then able to automatically activate the front camera 121. In doing so, a brightness value of a preview image taken via the rear camera 121' can be taken into consideration together with the arranged state of the mobile terminal 100.

When a sensing value sensed via the replaceable sensor described with reference to FIG. 3(c) and FIG. 3(d) is received from the external control device, an operation of the mobile terminal is described in detail with reference to FIG. 8 as follows. In particular, FIG. 8 is a diagram illustrating display screen configurations to describe an operation in response to a sensing value received from an external control device in a mobile terminal according to one embodiment of the present invention.

In FIG. 8, assume that the replaceable sensor 270 is installed in the perforated opening 230 of the external control device 200 after the mobile terminal 100 and the external control device 200 have been successfully paired with each other. Referring to FIG. 8(a), as the replaceable sensor is installed, the external control device 200 confirms a type of the sensor and then transmits information on the type of the sensor and a signal, which indicates that the corresponding sensor is connected, to the mobile terminal 100. If so, the corresponding information on the sensor and the sensor connection may be displayed on the touchscreen 151 as a popup window 810.

In addition to the information on the type of the connected sensor, menus for enabling a user to designate additional operations may be displayed on the popup window 810. In doing so, if a confirm button 815 is simply selected, the controller 180 may control the popup window 810 to disappear without a separate operation. After a widget add check box 811 or a state display line add check box 813 has been selected, if the confirm button 815 is selected, the controller 180 may perform an additional operation in response to the selected box.

For instance, after the widget add check box 811 has been selected, if the confirm button 815 is selected, referring to FIG. 8(b), a sensor widget 820 may be added to a home screen of the mobile terminal 100. If a 'cancel' button is selected from the sensor widget 820, the corresponding widget can be removed from the home screen. If a 'state' button is selected, the controller 180 makes a request for a sensing value to the external control device 200. If the sensing value is received, referring to FIG. 8(c), the controller 180 may control the sensing value to be displayed on a corresponding widget 820'.

Of course, without the process shown in FIG. 8(b), it can display the widget 820' having the sensing value displayed thereon (FIG. 8(c)). In this instance, the controller 180 can request the external control device 200 to transmit a sensing value by periods and/or each time the sensing value is changed.

After the state display line add check box 813 has been selected in FIG. 8(a), if the confirm button 815 is selected, referring to FIG. 8(d), a sensing value 830 may be displayed on a state display line (or an indicator region) provided to a top end portion of the home screen.

The temperature sensor is assumed as the replaceable sensor in FIG. 8, by which the present invention is non-limited. And, sensors of various types are applicable to the present invention. Therefore, the type or configuration of the information displayed on a widget may be changeable to be appropriate for the type of the corresponding sensor.

Operations of External Control Device

According to the embodiments mentioned in the foregoing description, when a signal is received from an external control device, an operation performed in a mobile terminal is mainly explained. In the following description, an operation of an external control device for a signal received from a mobile terminal is explained.

First of all, if a user inputs a command or an event (e.g., a message reception, an incoming call signal, a low remaining battery level, etc.) occurs, the controller 180 of the mobile terminal 100 can transmit a corresponding signal to the external control device 200 via the short range communication module 114. Having received the signal, the external control device 200 controls the light emitting unit 220 to flash in a pattern corresponding to the signal or may control vibration, sound and/or the like to be output. For instance, if a signal is received form the mobile terminal 100 to indicate that a message is received, the external control device 200 can control the light emitting unit 220 to flash in green. If a signal is received to indicate that there is an inclining call signal, the external control device 200 may control the light emitting unit 220 to flash in red.

Whether to perform the above-mentioned operation may be determined depending on a distance from the mobile terminal 100 as well (e.g., if a distance between the mobile terminal 100 and the external control device 200 is equal to or greater than a prescribed threshold distance). In particular, when the distance between the mobile terminal 100 and the external control device 200 is considerably short, it is highly possible for a user to be aware of an event occurring in the mobile terminal 100 using such an output as a sound, a vibration and the like only. In this instance, if a flash, a sound, a vibration or the like is unnecessarily output from the external control device 200, it can increase the battery consumption of the external control device 200.

Besides, according to the above-described embodiments, the mobile terminal 100 and external control device 200 are explained as exchanging signals by Bluetooth, by which the present invention is non-limited. Further, the signal exchange can be implemented by various short range communication systems.

Accordingly, the present invention provides the following effects and/or features. First of all, a user can control a mobile terminal more conveniently using an external control device according to at least one embodiment of the present invention.

Secondly, the present invention enables a mobile terminal to provide different functions in response to a distance from an external device. Thirdly, according to an embodiment of the present invention, if a command for performing a specific function is input via an external device, a mobile terminal determines whether to activate a lock function or whether a camera photographing is available and is then able to perform a corresponding function adaptively.

Effects obtainable from the present invention are non-limited by the above mentioned effect. In addition, other unmentioned effects can be clearly understood from the following description by those having ordinary skill in the technical field to which the present invention pertains.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display configured to display information;
a short range communication module configured to exchange a signal with an external control device; and
a controller configured to:
receive the signal from the external control device,
determine a context at a timing point of receiving the signal, and
control an operation corresponding to the signal to be performed in the determined context,
wherein the operation includes an activation/deactivation of a lock mode of the mobile terminal and an indicating of a location of the mobile terminal,
wherein after the lock mode has been entered in response to a deviation from a threshold distance, the lock mode is automatically cancelled when a distance between the mobile terminal and the external control device becomes smaller than the threshold distance, and
wherein the controller is further configured to output a sound or vibration, when the indicating of the location of the mobile terminal is performed in response to a manipulation of the external control device.

2. The mobile terminal of claim 1, wherein the controller is further configured to determine a distance from the external control device by measuring a strength of the signal received from the external control device.

3. The mobile terminal of claim 2, wherein the context comprises at least one of a type of an application activated at the signal received timing point, the determined distance and activation/deactivation of the lock mode.

4. The mobile terminal of claim 3, wherein the controller is further configured to determine the activation/deactivation of the display depending on the determined distance.

5. A mobile terminal comprising:
a first camera and a second camera arranged in different directions on the mobile terminal;
a display configured to display information;
a short range communication module configured to exchange a signal with an external control device; and
a controller configured to:
receive the signal from the external control device,
determine a context at a timing point of receiving the signal, and
control an operation corresponding to the signal to be performed in the determined context,
wherein the operation includes at least one of activation/deactivation of the display, an activation/deactivation of a lock mode of the mobile terminal, a volume operation and a camera operation, and
wherein if the received signal includes a command for activating the camera operation, the controller is further configured to determine a camera to activate using a preview image taken via each of the first camera and the second camera.

6. The mobile terminal of claim 5, wherein when the command for activating the camera operation is received, the controller is further configured to activate the camera operation irrespective of activation/deactivation of the lock mode.

7. The mobile terminal of claim 1, wherein the controller is further configured to display information on the operation corresponding to the signal on the display unit.

8. The mobile terminal of claim 1, wherein the short range communication module is further configured to communicate with the external control device by one of BLUETOOTH, NFC (near field communication), RFID (radio frequency identification), IrDA (infrared data association), UWB (ultra wideband) and ZIGBEE.

9. A method of controlling a mobile terminal, the method comprising:
pairing, via a short range communication module of the mobile terminal, an external control device with the mobile terminal; and
receiving, via a controller of the mobile terminal, a signal from the external control device;
determining, via the controller, a context at a timing point of receiving the signal; and
controlling, via the controller, an operation corresponding to the signal to be performed in the determined context,
wherein the operation includes an activation/deactivation of a lock mode of the mobile terminal and an indicating of a location of the mobile terminal,
wherein after the lock mode has been entered in response to a deviation from a threshold distance, the lock mode is automatically cancelled when a distance between the mobile terminal and the external control device becomes smaller than the threshold distance, and
wherein the method further comprises outputting a sound or vibration, when the indicating of the location of the mobile terminal is performed in response to a manipulation of the external control device.

10. The method of claim 9, further comprising:
determining, via the controller, a distance from the external control device by measuring a strength of the signal received from the external control device.

11. The method of claim 10, wherein the context comprises at least one of a type of an application activated at the signal received timing point, the determined distance and activation/deactivation of the lock mode.

12. The method of claim 11, further comprising:
determining, via the controller, the activation/deactivation of the display depending on the determined distance.

13. A method of controlling a mobile terminal, the method comprising:
pairing, via a short range communication module of the mobile terminal, an external control device with the mobile terminal; and
receiving, via a controller of the mobile terminal, a signal from the external control device;
determining, via the controller, a context at a timing point of receiving the signal;
controlling, via the controller, an operation corresponding to the signal to be performed in the determined context,
wherein the operation includes at least one of an activation/deactivation of a display of the mobile terminal, an activation/deactivation of a lock mode of the mobile terminal, a volume operation and a camera operation; and
if the received signal includes a command for activating the camera operation, determining a camera to activate using a preview image taken via each of a first camera and a second camera arranged in different directions on the mobile terminal.

14. The method of claim 13, wherein when the command for activating the camera application is received, the method further comprises activating the camera operation irrespective of activation/deactivation of the lock mode.

15. The mobile terminal of claim 1, further comprising:
a first camera and a second camera arranged in different directions on the mobile terminal,
wherein the operation further includes an activation/deactivation of the display, and
wherein if the received signal includes a command for activating the camera operation, the controller is further configured to determine a camera to activate using a preview image taken via each of the first camera and the second camera.

16. The mobile terminal of claim 15, wherein when the command for activating the camera operation is received, the controller is further configured to activate the camera operation irrespective of activation/deactivation of the lock mode.

17. The method of claim 9, further comprising:
if the received signal includes a command for activating the camera operation, determining a camera to activate using a preview image taken via each of a first camera and a second camera arranged in different directions on the mobile terminal,
wherein the operation further includes an activation/deactivation of the display.

18. The method of claim 17, wherein when the command for activating the camera application is received, the method further comprises activating the camera operation irrespective of activation/deactivation of the lock mode.

* * * * *